US009243148B2

(12) United States Patent
Keoshkerian et al.

(10) Patent No.: US 9,243,148 B2
(45) Date of Patent: Jan. 26, 2016

(54) PREPARATION OF PIGMENT DISPERSIONS AND TONER COMPOSITIONS

(71) Applicant: XEROX CORPORATION, Norwalk, CT (US)

(72) Inventors: Barkev Keoshkerian, Thornhill (CA); C. Geoffrey Allen, Waterdown (CA); Naveen Chopra, Oakville (CA); Michelle N. Chretien, Mississauga (CA); Daryl W. Vanbesien, Burlington (CA); Jenny Eliyahu, Maple (CA)

(73) Assignee: XEROX CORPORATION, Norwalk, CT (US)

( * ) Notice: Subject to any disclaimer, the term of this patent is extended or adjusted under 35 U.S.C. 154(b) by 329 days.

(21) Appl. No.: 13/853,169

(22) Filed: Mar. 29, 2013

(65) Prior Publication Data

US 2014/0295338 A1 Oct. 2, 2014

(51) Int. Cl.
| | |
|---|---|
| *B02C 17/20* | (2006.01) |
| *C09C 3/04* | (2006.01) |
| *C09C 1/56* | (2006.01) |
| *C09D 11/322* | (2014.01) |
| *G03G 9/09* | (2006.01) |
| *C09C 1/30* | (2006.01) |

(52) U.S. Cl.
CPC ............. *C09C 3/041* (2013.01); *B02C 17/20* (2013.01); *C09C 1/3018* (2013.01); *C09C 1/56* (2013.01); *C09D 11/322* (2013.01); *G03G 9/09* (2013.01); *C01P 2004/51* (2013.01); *C01P 2004/52* (2013.01); *C01P 2004/61* (2013.01); *C01P 2004/62* (2013.01)

(58) Field of Classification Search
CPC .......... B02C 17/20; C09C 3/041; C09C 1/56; C09D 11/322
USPC .................................................. 241/21, 184
See application file for complete search history.

(56) References Cited

U.S. PATENT DOCUMENTS

| | | | |
|---|---|---|---|
| 3,644,263 A | 2/1972 | Burke, Jr. | |
| 3,879,327 A | 4/1975 | Burke, Jr. | |
| 4,243,566 A | 1/1981 | Burke, Jr. | |
| 4,332,354 A * | 6/1982 | deMonterey et al. | 241/16 |
| 5,346,797 A | 9/1994 | Kmiecik-Lawrynowicz et al. | |
| 5,364,729 A | 11/1994 | Kmiecik-Lawrynowicz et al. | |
| 5,403,693 A | 4/1995 | Patel et al. | |
| 5,418,108 A | 5/1995 | Kmiecik-Lawrynowicz et al. | |
| 5,500,331 A * | 3/1996 | Czekai et al. | 430/449 |
| 5,501,935 A | 3/1996 | Patel et al. | |
| 5,527,658 A | 6/1996 | Hopper et al. | |
| 5,585,215 A | 12/1996 | Ong et al. | |
| 5,650,255 A | 7/1997 | Ng et al. | |
| 5,650,256 A | 7/1997 | Veregin et al. | |
| 5,662,279 A * | 9/1997 | Czekai et al. | 241/21 |
| 6,634,576 B2 * | 10/2003 | Verhoff et al. | 241/21 |
| 7,683,142 B2 | 3/2010 | Lai et al. | |
| 7,977,024 B2 | 7/2011 | Zhou et al. | |
| 8,124,309 B2 | 2/2012 | Lai et al. | |
| 8,163,459 B2 | 4/2012 | Farrugia et al. | |
| 8,168,699 B2 | 5/2012 | Lincoln et al. | |
| 2004/0251329 A1 * | 12/2004 | Hsu et al. | 241/15 |

* cited by examiner

*Primary Examiner* — Mark Rosenbaum
(74) *Attorney, Agent, or Firm* — Pillsbury Winthrop Shaw Pittman LLP

(57) ABSTRACT

A method for preparing a pigment dispersion includes milling a starting pigment dispersion containing a pigment and optionally a carrier and a dispersant with milling media having an average particle size of about 100 μm or less, until a final pigment dispersion having at least one of a desired pigment average particle size and a desired pigment particle size distribution is obtained; optionally separating the milling media from the final pigment dispersion; and optionally diluting the final pigment dispersion to obtain a desired pigment particle concentration.

12 Claims, 2 Drawing Sheets

PREPARATION OF PIGMENT DISPERSIONS AND TONER COMPOSITIONS

TECHNICAL FIELD

The present disclosure is generally directed to a process for preparing a pigment dispersion.

BACKGROUND

Pigment dispersions are part of many systems and compositions. For example, even in only the printing and imaging field, pigment dispersions are used in making photoreceptors, inks, toners, paints, and the like. Generally, pigmented systems require the grinding down of large-sized pigment agglomerates to desired small-sized pigment sized dispersions, such as grinding down from micron-sized agglomerates to desired nanometer-sized particles. The pigments are also generally contained in a dispersion, where the grinding down or particle size reduction is accompanied by appropriate dispersants to achieve stable dispersions.

The most common method for pigment particle size reduction is to use milling media to accomplish the particle size reduction. Historically, this milling has occurred with the use of millimeter- to sub-millimeter-sized media, such as in the range of 6 or 3 mm down to about 600 µm. Recently, the trend has been to further decrease the milling media size, such as to about 300 µm. The smaller media particle size is desired because the smaller the milling media particle, the faster the particle size reduction of the pigment agglomerates, although with an appropriate increase in milling media agitation.

A problem with reducing the milling media particle size, however, is that generally as the particle size decreases, the product cost of the milling media increases. While it may be desirable to decrease the milling media particle size below 300 µm, that smaller size milling media becomes prohibitively more expensive. For example, the product cost for milling media can reach or exceed $1,000/kg for sub-100 micron beads.

Numerous processes are within the purview of those skilled in the art for forming a wide variety of compositions using pigments and pigment dispersions. For example, inks can be formed by mixing the pigment dispersion with a liquid carrier and other optional components; photoreceptors can be formed by mixing the pigment dispersion with a film-forming resin to form different layers of the photoreceptors; and toners can be formed by mixing the pigment dispersion with resin particles, wax particles, and other additives, either in a conventional mixing apparatus or in en emulsion/aggregation process.

It would be advantageous to provide new and improved processes for forming pigment dispersions of a desired small particle size, using less expensive milling media and milling processes.

SUMMARY

The present disclosure in embodiments addresses the above and other needs by providing an improved process for preparing pigment dispersions of desired small particle size. The processes for preparing pigment dispersions of the present disclosure enable pigment dispersion preparation at lower cost, using less energy, and using less capital-intensive equipment compared to conventional processes.

More particularly, the present disclosure provides a method for preparing a pigment dispersion, the method comprising:

milling a starting pigment dispersion containing a pigment and optionally a carrier and a dispersant with milling media having an average particle size of about 100 µm or less, until a final pigment dispersion having at least one of a desired pigment average particle size and a desired pigment particle size distribution is obtained;

optionally separating the milling media from the final pigment dispersion; and optionally diluting the final pigment dispersion to obtain a desired pigment particle concentration.

DETAILED DESCRIPTION

Disclosed herein are a process for preparing a pigment dispersion. The process for preparing a pigment dispersion generally includes grinding down larger-sized pigment agglomerates to desired small-sized pigment sized dispersions, using milling media having an average particle size of about 100 µm or less, such as about 15 nm to about 75 µm or about 30 to about 50 µm. Rather than using conventional milling media such as zirconium/yttrium oxides, the process of this disclosure uses milling media such as diamond dust, silicon carbide, boron carbide, iron oxide, and the like.

Figure 1:
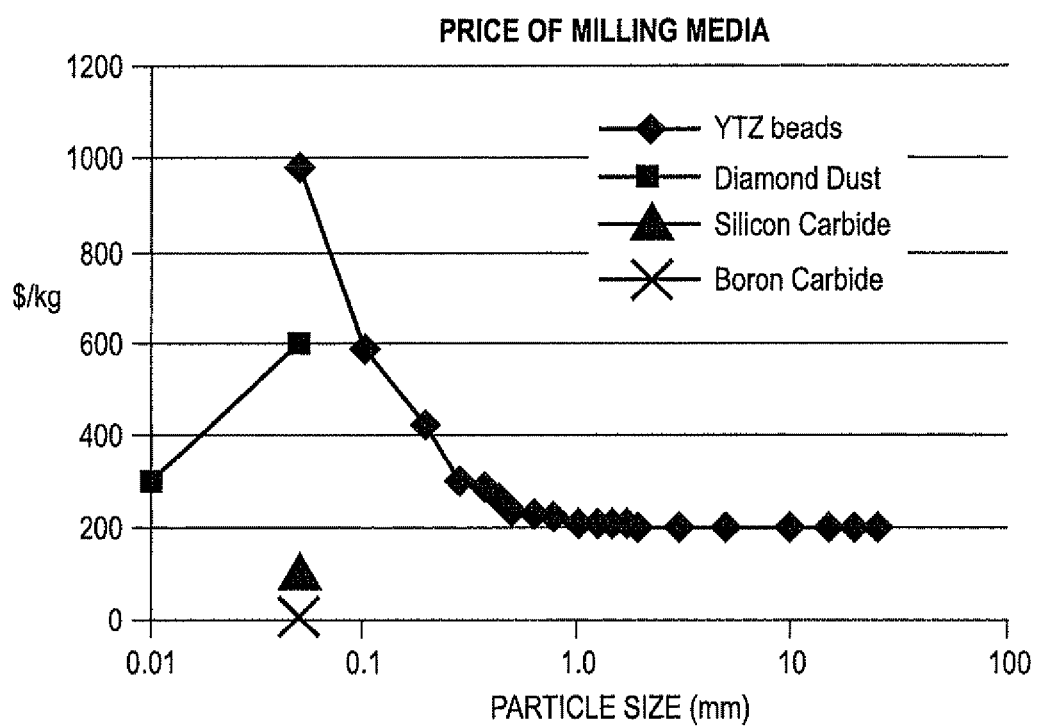
FIG. 1 shows the average cost of different milling media as a function of average particle size of the milling media.

The processes of the present disclosure provide significant and unexpected results over conventional processes. For example, although the milling media used in the present processes are smaller in average particle size than conventional milling media, these milling media are cheaper than the conventional milling media, and particularly much cheaper than the conventional milling media would be at the reduced average particle size. For example, the cost of diamond dust in the 50 µm average particle size range is about $600/kg. In contrast, the cost of zirconium/yttrium oxides of similar particle size is about $1,000/kg. FIG. 1 graphically shows how the unit price for conventional milling media increases exponentially as the size decreases towards 200 µm average particle size, while the unit price of the milling media of the present disclosure is significantly less.

The reduced average particle size of the milling media being used also accomplishes the particle size reduction to nanometer size with reduced milling times to afford stable dispersions. For example, the same particle size reduction can be accomplished according to the present processes in about 2 hours or less, compared to about 24 hours for conventional milling processes. The process is also much simpler than conventional milling equipment, requiring only a high speed mixer followed by filtration to afford the dispersion and the milling media can be recovered and reused. In contrast, conventional milling requires more complicated and expensive milling equipment that has seals, complicated mechanics, and is capital intensive. Furthermore, the milling media, for example, diamond dust, is significantly harder than conventional yttrium stabilized zirconia beads and thus will last longer. This imparts a further reduction in the average cost of the milling media and of the overall milling process.

The pigment dispersions prepared by the disclosed process can subsequently be used in any of a wide variety of products and processes, where a pigment dispersion is desired. In one exemplary embodiment, the present disclosure also provides processes to incorporate pigments, including black, white, and colored pigments, into an ink, such as a solid or phase change ink or a liquid ink jet ink. In another exemplary embodiment, the present disclosure also provides chemical processes to incorporate pigments, including black, white, and colored pigments, into an emulsion aggregation toner. The processes herein utilize the disclosed process for preparing a pigment dispersion to make the subsequent overall product preparation process more efficient.

Preparation of Pigment Dispersion

Pigments are typically provided in the form of a dispersion of the desired sized particles in a suitable dispersant. The pigment dispersion may include, for example, submicron colorant particles having a size of, for example, from about 50 to about 500 nanometers in volume average diameter, such as from about 100 to about 400 nanometers or from about 150 to about 350 nanometers in volume average diameter. The pigment particles may be suspended in an aqueous water phase containing an anionic surfactant, a nonionic surfactant, or combinations thereof. For example, in embodiments, the surfactant may be ionic and may be present in a dispersion in an amount from about 0.1 to about 25 percent by weight of the pigment, such as from about 1 to about 15 percent by weight of the pigment.

Any suitable and desired pigment color can be selected, such as carbon black, cyan, yellow, magenta, red, orange, brown, green, blue, violet, and/or combinations thereof. In embodiments wherein the colorant is a pigment, the pigment may be, for example, carbon black, phthalocyanines, quinacridones or RHODAMINE B™ type, red, green, orange, brown, violet, yellow, fluorescent colorants, and the like. The pigment can be in the form of one type of pigment or a mixture of two or more types of pigments.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigment magnetites including, NP604™, NP608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YEL'LOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido)phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, combinations of any of the foregoing, and the like. The dyes may be utilized in various suitable amounts, for example from about 0.5 to about 20 percent by weight of the toner, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant.

According to embodiments, the pigment dispersion is prepared by a process comprising:
1) providing a starting pigment dispersion containing a pigment and optionally a carrier and a dispersant;
2) mixing the starting pigment dispersion with milling media having an average particle size of about 100 μm or less;
3) milling the mixture until a final pigment dispersion having at least one of a desired pigment average particle size and a pigment particle size distribution is obtained;
4) optionally separating the milling media from the final pigment dispersion; and
5) optionally diluting the final pigment dispersion to obtain a desired pigment particle concentration for subsequent use.

The pigment dispersion according to the present disclosure is formed by grinding down larger-sized pigment agglomerates to desired small-sized pigment sized particles. For example, the starting larger-sized pigment agglomerates are generally provided in the form of a dispersion of pigment agglomerates where the agglomerates have an average size of from about 300 nm or greater to as much as about 1 μm or more. Of course, the starting larger-sized pigment can be provided in other forms, such as a dispersion of particles of larger particle size than desired, and the like. These starting larger-sized pigments must be reduced in size to provide the desired pigment particle sizes for use in various applications, such as toner preparation. For example, for toner or ink preparation, the starting larger-sized pigments must be reduced in size to the above sizes of, for example, from about 50 to about 500 nanometers in volume average diameter, such as from about 100 to about 400 nanometers or from about 150 to about 350 nanometers in volume average diameter.

The grinding of the starting larger-sized pigment is conducted using a different milling media than has heretofore conventionally been used in the art for pigment processing. That is, conventional pigment processing has used such milling media as zirconium/yttrium oxides, stainless steel balls, and the like. Furthermore, those conventional milling media have typically had an average particle size of from about 300 μm or greater to as much as about 3 mm or more. Thus, in embodiments, the milling media used is completely or substantially free of the conventional zirconium/yttrium oxides, stainless steel balls, and the like.

The milling media used in the process has an average particle size of about 100 μm or less, such as about 15 nm to about 75 μm or about 30 nm to about 50 μm. Rather than using conventional milling media such as zirconium/yttrium oxides, the process of this disclosure uses milling media (or lapping media) such as diamond dust, silicon carbide, boron carbide, metal oxides such as iron oxide or aluminum oxide, corundum, garnet, and the like.

In one exemplary embodiment, the present disclosure allows for the use of milling media that is significantly smaller than what would conventionally be permitted or practical. For example, in the case of iron oxide milling media that can be removed from the final pigment dispersion by use of a magnet or the like, it is possible to use milling media that is sub-micron sized, such as from about 15 nm to about 100 nm, or from about 30 nm or about 50 nm to about 100 nm or about 500 nm.

Any desired shaped milling media can be used. However, in embodiments, it is desired that the milling media be aspherical, or not perfectly spherically shaped. For example, a benefit of the use of diamond dust is that the diamond dust is not spherical in nature, and thus during the milling process it imparts higher sheer forces to the pigment and gives better particle size reduction.

To proceed with the milling process, the starting pigment material is mixed with the milling media. For example, in one embodiment, a continuous phase such as a solvent for the pigment dispersion is added to the milling media, followed by addition of the starting pigment material. As will be apparent, the relative ratio of starting pigment material to milling media can be adjusted as desired and necessary to prepare the desired end product. For example, suitable ratios of starting pigment material to milling media can be from about 1 to about 30, such as from about 1 to about 10 or from about 1 to about 3, on a weight basis.

In an embodiment, the milling step can be conducted in any suitable apparatus that provides the desired agitation to the pigment material and milling media, and in the desired size. For example, in contrast to conventional complicated milling equipment, the process of the present disclosure in an embodiment can be conducted in a simplified apparatus such as a high speed mixer. In this embodiment, the pigment agglomerates, dispersant, solvent, and milling media can be mixed in a beaker, which provides a much simpler and cost-effective apparatus. Milling can continue until the desired pigment particle size and/or particle size distribution are reached. The milling time will depend upon the degree of size reduction, but in embodiments is from about 15 minutes to about four hours, such as about 30 minutes or about 45 minutes to about two or to about three hours.

Once the milling is completed, the contents can be processed to remove the milling media from the resultant pigment dispersion. For example, the pigment can be filtered to provide the pigment dispersion, while the removed milling media can be prepared to be reused in another milling process. Any suitable filtration or separation process can be used, as appropriate depending upon the milling media, pigment dispersion, and the like. For example, for diamond dust and carbides, filtration may suitably remove the milling media from the pigment dispersion. For other milling media, such as iron oxide, a magnet can be used to remove the milling media from the pigment dispersion, such as while decanting the pigment dispersion.

The pigment dispersion can be diluted, if desired, to provide a suitable dispersion for the intended use. This dilution can be conducted during the milling process, or can be conducted once the milling has been completed and the milling media removed.

The milling process can also include analysis and quality control steps to help ensure the desired product is obtained. For example, where particle size and particle size distribution are important factors, those features may be directly measured during or after the milling process. In other applications, such as for inks, the filtration rate and stability of the ink made from the dispersion can be measured as an indicator of the quality of the dispersion.

For use in ink and toner compositions, the amount of the pigment employed in making the ink or toner may be from about 1 weight percent to about 50 weight percent of the ink or toner composition, such as from about 10 weight percent to about 35 weight percent, from about 15 weight percent to about 30 weight percent, from about 5 to about 25 weight percent, or from about 5 to about 15 weight percent of the ink or toner composition. However, amounts outside these ranges can also be used. For other applications, the amount of pigment can be suitably adjusted as necessary and as will be known to those skilled in the art.

Preparation of Products

In one embodiment, the pigment dispersion prepared as above can be used to make a toner, such as by a chemical or emulsion/aggregation process. The pigment dispersion can be added to a pre-toner mixture, or it can be mixed with dispersions, suspensions, or mixtures of the other toner ingredients, such as before particle aggregation in the emulsion aggregation coalescence process. A binder resin, an optional wax, such as a wax dispersion, and any other desired or required additives, and optionally surfactants, may form the pre-toner mixture. The pre-toner mixture may be prepared and the pH of the resulting mixture may be adjusted by an acid. Following the preparation of the above mixture, including the addition or incorporation of the pigment dispersion, an aggregating agent may be added to the mixture and the emulsion/aggregation process may proceed. Methods of emulsion/aggregation/coalescing for preparing toners that can utilize the pigment dispersion of the present disclosure are not limited, and include, for example, those processes illustrated in U.S. Pat. Nos. 3,644,263; 3,879,327; 4,243,566; 5,403,693; 5,418,108; 5,364,729; 5,346,797; 5,527,658; 5,585,215; 5,650,255; 5,650,256; 5,501,935; 7,683,142; 7,977,024; 8,124,309; 8,163,459; and 8,168,699, the disclosures of which are hereby incorporated by reference in their entirety.

In another embodiment, the pigment dispersion prepared as above can be used to make an ink, such as a solid or phase change ink or a liquid ink jet ink. The ink compositions can be prepared by any desired or suitable method. For example, by mixing together the colorant in the form of the pigment dispersion, with a carrier material and other desired additives. In the case of the solid or phase change ink, the mixture can be heated to at least its melting point, for example from about 60 to about 150° C., such as from about 80 to about 140° C., or from about 85 to about 120° C. The pigment dispersion may be added before the ink ingredients have been heated or after the ink ingredients have been heated.

A wide variety of other uses can be made of the pigment dispersion, as will be apparent to those skilled in the art. For example, almost anywhere a pigment dispersion can be used in forming a product or conducting a process, the pigment dispersions of the present disclosure may be suitably used.

EXAMPLES

Example 1

A pigment dispersion was made using diamond dust as the milling media. To a stainless steel beaker was added diamond dust (Lands Superabrasives-LS600T-50 μm sized, 307 g). To this was added slowly 100 g of a pre-mixed suspension of carbon black (Cabot-Mogul E-100 g, starting average particle size>1 μm), EFKA 4340 dispersant (52.7 g) (an acrylic block copolymer, obtained from BASF), and SR9003 (280 g) (propoxylated neopentyl glycol diacrylate, manufactured by Sartomer Company Inc.), while mixing with a Dispermat TML-1 mixer at ~2000 rpm. As the mixture got thick the speed was eventually raised to 6200 rpm and maintained for 90 minutes. The speed was dropped to 2000 rpm and a further 38.6 g of SR9003 was added to give a final solids loading of 15.7% carbon black in SR9003. The dispersion was then filtered with vacuum using a Whatman #4 filter paper to separate the diamond dust from the dispersion.

Comparative Example 1

A pigment dispersion was made using zirconium oxide beads as the milling media. To a 2 L beaker was added EFKA in SR9003 (987.9 g at 32.8% solids, 540 g Mogul E carbon black—starting average particle size>1 µm) and SR9003 (2721.9 g). This was homogenized at 6,000 rpm (for 15 minutes) using a homogenizer. Then 886.4 g of this suspension was added to a horizontal Dyno Mill with 1610.9 g of a zirconium oxide 0.6 mm beads. This was then run at ~3500 rpm for 2 hrs to afford a carbon black dispersion (15% solids loading). The zirconium oxide beads were separated from the dispersion using a stainless steel sieve.

Example 2

To a double walled beaker was added SR9003 (47.5 g) and EFKA 4340 in SR9003 (40.5 g at 32.6% solids). This was stirred slowly and then Ferrite (35 um size, 270 g) was added. While stirring at 3,000 rpm carbon black (Mogul E, 22 g) was added. The speed was increased to 8000 rpm while cooling the beaker. This was stirred for 90 minutes then the speed was decreased and SR9003 (36 g) was added to bring the carbon black loading to 15%. The dispersion was decanted while applying a magnet to keep the ferrite separate from the dispersion, affording 107.7 g of dispersion.

Example 3

To a double walled beaker was added SR9003 (47.5 g) and EFKA 4340 in SR9003 (40.5 g at 32.6% solids). This was stirred slowly and then. Ferrite (35 um size, 270 g) was added. While stirring at 3,000 rpm carbon black (Mogul E, 22 g) was added. The speed was increased to 8000 rpm while cooling the beaker. This was stirred for 30 minutes then the speed was decreased and SR9003 (36 g) was added to bring the carbon black loading to 15%. The dispersion was decanted while applying a magnet to keep the ferrite separate from the dispersion, affording 112 g of dispersion.

Analysis

Figure 2:
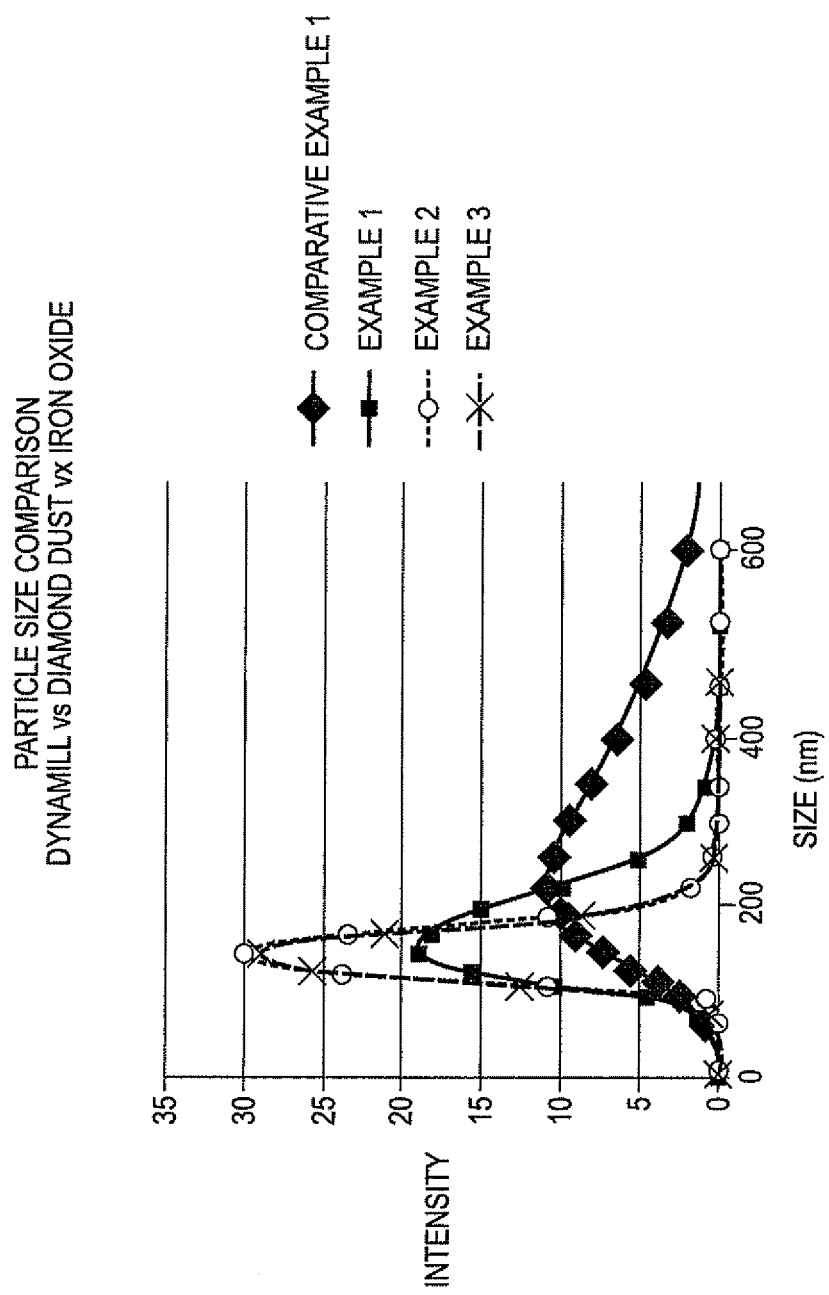
FIG. 2 shows the particle size distributions for pigment dispersions made according to the Examples.

The particle sizes of the dispersions of Examples 1-3 and Comparative Example 1 were determined by dynamic light scattering using a Malvern ZS90 nanosizer. The results are shown in FIG. 2. The results show that as between Example 1 and Comparative Example 1, the diamond dust gives a comparable particle size of ~100 nm but with a better particle size distribution especially in the lower particle size region. The results for Examples 2 and 3 show that the ferrite milling media provides a narrow particle size distribution especially in the lower particle size region. This demonstrates that with the use of micron sized inorganic hard particles, one can achieve particle size reduction and achieve excellent dispersions with a reduced time, less expensive capital equipment, and a simpler overall process.

Example 4

A solid or phase change ink is made using the pigment dispersion of Example 1 as follows. The pigment dispersion is diluted with the remaining ink ingredients to form an ink. The following components are melted and stir-mixed in a 4 liter beaker at 125° C.: the pigment dispersion (243 grams); stearyl stearamide wax (KEMAMIDE® S-180, obtained from Crompton Corp., Greenwich, Conn., 463.55 g); KE-100 resin (a glycerol ester of a hydrogenated rosin, obtained from Arakawa Chemical Industries Ltd., 309.03 grams; NAUGARD® N445 antioxidant (obtained from Crompton Corp., Greenwich, Conn., 4.09 grams), X1197 polyethylene wax (from Baker Petrolite, 1236.13 g), and a urethane resin prepared as described in Example 4 of U.S. Pat. No. 6,309,453, the disclosure of which is totally incorporated herein by reference (55.20 grams). The ingredients are homogenized in an IKA® Ultra Turrax T50 Homogenizer for an additional 60 minutes at 120° C. to allow the ink to mix. The resulting ink is then filtered through a 1 µm glass fiber cartridge-filter at about 115° C. and demonstrates good print quality performance in a Xerox solid inkjet printer.

Comparative Example 2

An ink composition is formed as in Example 4, except that the pigment dispersion of Example 1 is replaced by the pigment dispersion of Comparative Example 1. An ink composition of similar properties as in Example 4 is obtained.

It will be appreciated that various of the above-disclosed and other features and functions, or alternatives thereof, can be combined into many other different systems or applications. Also, various presently unforeseen or unanticipated alternatives, modifications, variations or improvements therein can be subsequently made by those skilled in the art, and are also intended to be encompassed by the following claims.

What is claimed is:

1. A method for preparing a pigment dispersion, the method comprising:
    milling a starting pigment dispersion containing a pigment and optionally a carrier and a dispersant with milling media having an average particle size of about 100 µm or less and being comprised of diamond dust, until a final pigment dispersion having at least one of a desired pigment average particle size and a desired pigment particle size distribution is obtained;
    separating the milling media from the final pigment dispersion; and
    diluting the final pigment dispersion to obtain a desired pigment particle concentration.

2. The method of claim 1, wherein the starting pigment dispersion comprises pigment particles having an average particle size of greater than about 1 µm, and the final pigment dispersion comprises pigment particles having an average particle size of less than about 500 nm.

3. The method of claim 1, wherein the starting pigment dispersion comprises pigment particles having an average particle size of greater than about 1 µm, and the final pigment dispersion comprises pigment particles having an average particle size of from about 100 nm to about 400 nm.

4. The method of claim 1, wherein the final pigment dispersion comprises pigment particles having an average particle size of from about 50 to about 500 nm.

5. The method of claim 1, wherein the milling media is substantially free of zirconium oxide, yttrium oxide, and stainless steel balls.

6. The method of claim 1, wherein the milling media has an average particle size of about 15 nm to about 75 µm.

7. The method of claim 1, wherein the milling time is for from about 15 minutes to about four hours.

8. The method of claim 1, wherein the milling media is removed from the final pigment dispersion before or after the final pigment dispersion is diluted to obtain a desired pigment particle concentration.

9. The method of claim 1, wherein the starting pigment dispersion comprises at least two different pigments.

10. The method of claim 1, wherein the starting pigment dispersion comprises carbon black.

11. A method for preparing a pigment dispersion, the method comprising:
    milling a starting pigment dispersion containing a pigment and optionally a carrier and a dispersant with milling media having an average particle size of about 100 μm or less and being comprised of diamond dust, until a final pigment dispersion having at least one of a desired pigment average particle size and a desired pigment particle size distribution is obtained; and
    separating the milling media from the final pigment dispersion,
    wherein the starting pigment dispersion comprises pigment particles having an average particle size of greater than about 1 μm, and the final pigment dispersion comprises pigment particles having an average particle size of less than about 500 nm.

12. A method for preparing a pigment dispersion, the method comprising:
    milling a starting pigment dispersion containing a pigment and optionally a carrier and a dispersant with milling media having an average particle size of about 100 μm or less and comprising aspherical diamond dust, until a final pigment dispersion having at least one of a desired pigment average particle size and a desired pigment particle size distribution is obtained;
    separating the milling media from the final pigment dispersion; and
    diluting the final pigment dispersion to obtain a desired pigment particle concentration.

* * * * *